United States Patent Office 2,889,893
Patented June 9, 1959

2,889,893

ADSORPTION SEPARATION PROCESS

Howard V. Hess, Glenham, and Edward R. Christensen, Beacon, N.Y., assignors to Texaco Inc., a corporation of Delaware No Drawing. Application March 28, 1955
Serial No. 497,444

10 Claims. (Cl. 183—114.2)

This invention relates to a method of fractionating mixtures. More particularly, this invention relates to a method of fractionating mixtures of materials possessing different critical temperatures. In accordance with one embodiment this invention relates to a method for fractionating mixtures of straight chain hydrocarbons containing the same or different numbers of carbon atoms.

Various processes have been proposed and employed for the fractionation of mixtures into their various components. For example fractional distillation, fractional crystallization, extractive distillation, extractive crystallization (urea complex formation), solvent extraction and selective adsorption have been proposed and employed to effect fractionation of mixtures containing close boiling or otherwise closely related compounds. For the most part these separation processes rely upon some difference in physical properties, such as boiling point or melting point, or some difference in chemical properties, such as degree of unsaturation or aromaticity in the materials being treated in order to effect the separation thereof.

Certain materials, solid selective adsorbents, have also been proposed to effect a separation of materials based upon differences in molecular size or configuration. Solid selective adsorbents which serve to fractionate mixtures according to their molecular size have been conveniently termed "molecular sieves." For example, Barrer U.S. 2,306,610 proposes to effect separation between straight chain hydrocarbons and non-straight chain hydrocarbons by contacting a mixture containing the same with a special selective adsorbent, a porous crystalline zeolite, the crystals of which possess pores of uniform molecular dimension, about 5 Angstrom units, which permit the entry and adsorption of straight chain hydrocarbons, such as normal paraffins, to the substantial exclusion of non-straight chain hydrocarbons, such as the isoparaffins, naphthenes and aromatic hydrocarbons.

Separation processes, however, either alone or in combination, have not satisfactorily afforded a solution to all separation problems. For example, the separation of isomeric olefins and isomeric diolefins for the recovery of a substantially pure particular olefin or diolefin is difficult by employing presently known processes.

Accordingly it is an object of this invention to provide an improved process for the fractionation of mixtures.

Another object of this invention is to provide an improved selective adsorption process for the fractionation of mixtures containing materials having different critical temperatures.

Still another object of this invention is to provide a process for the separation of one straight chain hydrocarbon from another straight chain hydrocarbon.

Yet another object of this invention is to provide a process for the fractionation of a mixture containing isomeric straight chain unsaturated hydrocarbons.

How these and other objects of this invention are accomplished will become apparent with reference to the accompanying disclosure. In at least one embodiment of this invention at least one of the foregoing objects will be achieved.

In accordance with our invention we have discovered that a mixture containing components A and B can be fractionated into a fraction relatively rich with respect to A by contacing said mixture with a solid adsorbent material, such as an adsorbent selective for components A and B, at a temperature above the critical temperature of A such that component B is now preferably adsorbed or adsorbed to a greater extent on said adsorbent with respect to A, component B having a higher critical temperature than component A, and recovering from the aforementioned contacting operation an effluent fraction relatively rich in component A with respect to the original feed mixture, the contacting temperature being above the critical temperature of component A and below the critical temperature of component B.

The process of this invention is widely applicable to the fractionation of mixtures of organic compounds and gases and is particularly applicable to the separation of mixtures of hydrocarbons such as are found in various petroleum fractions and the like. Moreover, this invention is particularly applicable to the separation of mixtures of straight chain hydrocarbons such as mixtures of normal paraffins and/or normal olefins and/or normal polyolefins, and/or straight chain acetylenic hydrocarbons.

By straight chain hydrocarbons, as employed herein, is meant any aliphatic or acylic or open chain hydrocarbon which does not possess side chain branching. Representative straight chain hydrocarbons are the normal paraffins and the normal olefins, mono- or polyolefins, including the straight chain acetylenic hydrocarbons. The non-straight chain hydrocarbons comprise the aromatic and naphthenic hydrocarbons as well as the isoparaffinic and isoolefinic hydrocarbons and the like.

Straight chain hydrocarbon mixtures which may be separated into various fractions in accordance with the practice of this invention include those straight chain hydrocarbons in the molecular weight range $C_2$–$C_{40}$ and higher and containing n-paraffins and/or n-olefins. Exemplary of the straight chain hydrocarbon mixtures which may be separated are: mixtures of normal paraffins in the molecular weight range $C_6$–$C_{12}$; mixtures of straight chain isomeric olefins such as mixtures of n-butenes, n-pentenes, n-hexenes, n-heptenes, n-octenes, n-nonenes, n-decenes, n-undecenes, n-dodecenes and higher; mixtures of straight chain $C_4$ diolefins, $C_5$ diolefins, $C_6$ diolefins, $C_7$ diolefins, $C_8$ diolefins; $C_6$ and higher straight chain polyolefins and the various straight chain non-isomeric and isomeric acetylenes and diacetylenes and the like. Mixtures containing straight chain saturated and unsaturated hydrocarbons can also be separated by employing the practice of this invention.

Stated more particularly, as applied to the fractionation of a mixture of straight chain hydrocarbons, the practice of this invention involves contacting at a temperature $T_f$ a gaseous mixture containing A and B, A and B being straight chain hydrocarbons, A having a critical temperature $T_{ac}$ and B having a critical temperature $T_{bc}$, and $T_f$ being higher than $T_{bc}$ and lower than $T_{ac}$, with a solid selective adsorbent which selectively adsorbs straight chain hydrocarbons such as A and B to the substantial exclusion of non-straight chain hydrocarbons and recovering from the aforesaid contacting operation a resulting treated gaseous effluent having a relatively increased proportion of B.

Although the practice of this invention, with respect to the fractionation of mixtures of straight chain hydrocarbons, is applicable to any solid selective adsorbent which selectively adsorbs straight chain hydrocarbons to the substantial exclusion of non-straight chain hydrocarbons, it is preferred to employ as the selective adsorbent for straight chain hydrocarbons certain natural or synthetic zeolites or alumino-silicates, such as a calcium alumino-silicate, which exhibit the properties of a molecular sieve, that is, matter made up of porous crystals wherein the pores of the crystals are of molecular dimension and are of substantially uniform size. In general, zeolites may be described as water-containing alumino-silicates having the same formula

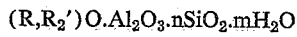

$(R,R_2')O.Al_2O_3.nSiO_2.mH_2O$ wherein R may be an alkaline earth metal such as calcium, strontium or barium or even magnesium and wherein R' is an alkali metal such as sodium or potassium or lithium. Generally the above-described materials, when dehydrated for the removal of substantially all of the water therefrom, retain their crystal structure and are particularly suitable as selective adsorbents for straight chain hydrocarbons to the substantial exclusion of non-straight chain hydrocarbons.

A particularly suitable solid adsorbent for straight chain hydrocarbons and useful in the practice of this invention is a calcium alumino-silicate, apparently actually a sodium calcium alumino-silicate, manufactured by Linde Air Products Company and designated Linde Type 5A Molecular Sieve. The crystals of this particular calcium alumino-silicate have a pore size or opening of about 5 Angstrom units, sufficiently large to admit straight chain hydrocarbons, such as the normal paraffins and the normal olefins, to the substantial exclusion of the non-straight chain hydrocarbons. This particular selective adsorbent is available in various sizes, such as in the form of 1/8" or 1/16" diameter pellets or as a finely divided powder having a particle size in the range 0.5–5.0 microns.

The selective adsorbent employed in the practice of this invention may be any suitable form or shape, granular, spheroidal or microspheroidal. Other suitable solid selective adsorbents which may be employed in the practice of this invention include the synthetic or natural zeolites which, when dehydrated, may be described as crystalline zeolites having a rigid three dimensional anionic network and having interstitial dimensions sufficiently large to adsorb straight chain hydrocarbons but sufficiently small to exclude the non-straight chain hydrocarbons possessing larger molecular dimensions. The naturally occurring zeolite, chabazite, exhibits such desirable properties. Another suitable naturally occurring zeolite, analcite $NaAlSi_2O_6.H_2O$ which, when dehydrated, and when all or part of the sodium is replaced by an alkaline earth metal, such as calcium, by base exchange yields a material which may be represented by the formula $(Ca,Na_2)Al_2Si_4O_{12}.2H_2O$ and which, after suitable conditioning, will adsorb straight chain hydrocarbons to the substantial exclusion of non-straight chain hydrocarbons. Other naturally occurring or synthetically prepared zeolites such as phacolite, gmelinite, harmotome and the like or suitable base exchange modifications of these zeolites may also be employed in the practice of this invention. Additionally it is contemplated that selective adsorbents having the property of selectively adsorbing straight chain hydrocarbons to the substantial exclusion of non-straight chain hydrocarbons in the manner of a molecular sieve may be obtained by suitable treatment of various oxide gels, especially metal oxide gels of the polyvalent, amphoteric metal oxides.

The actual selective adsorptive separation operation in accordance with the practice of this invention is preferably carried out in the gaseous phase at a temperature above the critical temperature of the component or components to be separated and/or recovered in the resulting gaseous treated effluent which is substantially free or contains a reduced amount of the component or components possessing a critical temperature higher than the actual contacting or adsorption temperature employed. The components possessing a critical temperature greater than the contacting temperature are adsorbed on the selective adsorbent to a much greater extent, or even to the substantial exclusion of those components having a critical temperature lower than the contacting temperature. In general it is preferred to carry out the contacting or actual adsorptive separation operation at a pressure substantially below the critical pressure of the component or components undergoing separation (relatively unadsorbed by the adsorbent) e.g., about 100–200 p.s.i. and lower, preferably at about atmospheric pressure, or a pressure in the range 0–150 p.s.i.g.

By way of explanation of the effect of critical temperature upon an adsorptive separation operation in accordance with this invention, it is speculated that when components such as straight chain hydrocarbons are selectively adsorbed on a particular adsorbent, such as an alkaline earth metal alumino-silicate, as exemplified by Linde Type 5A Molecular Sieve, the adsorbed components, straight chain hydrocarbons, are actually in the liquid or pseudo-liquid state when adsorbed within the adsorbent below their critical temperature. Under such circumstances the adsorptive capacity for the adsorbed material or straight chain hydrocarbons is relatively high. When, however, the selective adsorbent is contacted with the mixture of materials such as straight chain hydrocarbons to be fractionated at a temperature above the critical temperatures of these materials, liquefaction or concentration of the adsorbed materials contained within the adsorbent is substantially impossible by virtue of the fact that the contacting and adsorption operation is carried out above the critical temperature and substantially below the critical pressure of these compounds. Accordingly these compounds remain in the gaseous or similarly relatively dilute state even when contained within the pores of or on the surface of the adsorbent and the adsorptive capacity of the selective adsorbent for these materials is markedly reduced, particularly as compared with its capacity for these same materials at a temperature below the critical temperature thereof.

Various techniques and methods employing the teachings of this invention may be employed in the practice thereof. For example, in a gas phase selective adsorption operation for the adsorptive separation of materials A and B, material A having a higher critical temperature than material B, separation of A and B may be obtained by contacting these materials in the gaseous phase with a solid selective adsorbent for A and B at a temperature above the critical temperature of B but below the critical temperature of A so that material A is effectively adsorbed by the selective adsorbent to the substantial exclusion of material B which is recovered from the contacting operation as a gaseous effluent. In such an operation presumably material A, after penetration into the interstices of and upon adsorption by the selective adsorbent, is maintained therein in a pseudo-liquid state. Material B, however, since the adsorptive separation is carried out above its temperature remains as a relatively dilute gaseous phase diffused throughout the adsorbent material, the relative proportion of adsorbed material B as compared to adsorbed material A at the temperature of contacting being very small.

In another method for carrying out the teaching of this invention for the fractionation of a mixture containing A and B the mixture to be separated is contacted with the selective adsorbent at a temperature below the critical temperature of both A and B, either in the liquid phase or in the gas phase. The resulting adsorbent now substantially saturated with respect to compounds A and B is then treated at an elevated temperature above the critical temperature of compound B but below the critical temperature of compound A, compound B having a critical temperature $T_{bc}$ lower than the critical temperature of $T_{ac}$ of compound A, to effect the selective desorption of compound B.

Any suitable selective adsorption or selective desorption temperature may be employed in the practice of this invention depending upon the critical temperatures of the materials making up the mixture to be separated. Generally the separation process in accordance with this invention may be carried out at any temperature in the range 50–1100° F., more or less, as determined by the critical temperature of materials to be separated. In the instances where alumino-silicates, as exemplified by the alkaline earth metal alumino-silicates, are used as the selective adsorbent it is desirable to employ an adsorption or desorption separation temperature below about 1300° F,. preferably below about 1100° F., since relatively high temperatures in the range about 1100° F.–1300° F. in the instance of a Linde Type 5A Molecular Sieve adsorbent, are excessive and lead to the destruction of the adsorbent, presumably by collapse of the crystal structure with resultant loss of the selective adsorption properties of the particular adsorbent. If the adsorbent employed can tolerate higher temperatures correspondingly higher separation temperatures may be employed if necessary to achieve the desired separation.

After the desired separation has been carried out in accordance with this invention material remaining adsorbed in the selective adsorbent may be desorbed therefrom by heating the adsorbent above the critical temperature of the material adsorbed therein, preferably at the same time contacting the adsorbent or passing therethrough a gaseous desorbing medium such as hydrogen, methane, nitrogen, $CO_2$, steam, flue gas, or other normally gaseous or readily vaporized hydrocarbons, straight chain or non-straight chain hydrocarbons, at a temperature not only above the critical temperature of the gaseous desorbing medium but also above the critical temperature of the compound remaining adsorbed in the adsorbent.

The following examples are illustrative of the practice of this invention.

EXAMPLE NO. 1

A mixture of equal parts by volume n-hexane, n-heptane and n-octane was charged in the gaseous phase at atmospheric pressure and at a temperature above the critical temperature of n-hexane (455° F.) but below the critical temperature of n-heptane (512° F.) and n-octane (572° F.) employing a liquid hourly space velocity of about 0.06, to contact an alkaline earth metal alumino-silicate (Linde Type 5A Molecular Sieve) which adsorbs straight chain hydrocarbons to the substantial exclusion of non-straight chain hydrocarbons. The results are set forth in Table No. I.

Table No. I

| Fraction | Total vol. charged (cc.) | Vol. of Unadsorbed Effluent fraction (cc.) | Adsorption Temp., °F. | Composition of unadsorbed effluent fraction (liquid volume percent) | | |
|---|---|---|---|---|---|---|
| | | | | n-hexane | n-heptane | n-octane |
| Charge | | | | 34.0 | 32.0 | 34.0 |
| 1 | 174 | 23 | 469–515 | 97.8 | 1.1 | 1.1 |
| 2 | 290 | 100 | 464–525 | 53.5 | 45.5 | 1.0 |
| 3 | 300 | 14 | 490–512 | | | |

The above data illustrates the separation of n-hexane and n-hexane together with n-heptane from an admixture containing also n-octane by carrying out the selective adsorption operation above the critical temperature of the material to be separated in the unadsorbed gaseous effluent. The adsorption temperature was difficult to control due to the heat of adsorption.

EXAMPLE NO. 2

A second run was carried out at a space velocity of 0.06 with the adsorption or contacting temperature control at between the critical temperatures of n-heptane (512° F.) and n-octane (565° F.). The results are set forth in Table No. II.

Table No. II

| Fraction | Total vol. charged (cc.) | Vol. of Unadsorbed Effluent fraction (cc.) | Contact Temp., °F. | Composition of unadsorbed effluent fraction (liquid volume percent) | | |
|---|---|---|---|---|---|---|
| | | | | n-hexane | n-heptane | n-octane |
| Charge | | | | 34.0 | 32.0 | 34.0 |
| 1 | 172 | 23 | 515–581 | 96.0 | 4.0 | 0.0 |
| 2 | 300 | 107 | 528–562 | 43 | 40 | 17 |
| $CH_4$ sweep | | 25 | | | | |
| Desorption-Regeneration | | 125 | 542–960 | 20 | 34 | 46 |

A methane sweep was employed to displace the gaseous mixture from the adsorption vessel. Following sweeping with $CH_4$ the adsorbent was substantially completely regenerated by increasing its temperature to about 960° F. and at the same time sweeping or contacting the same with $CH_4$.

EXAMPLE NO. 3

Even when employing the relatively low space velocity of Examples I and II, temperature control during the contacting-adsorption operation was difficult due to the liberation of heat of adsorption, which, as indicated hereinabove, may be considered somewhat analogous to heat of condensation. In order to better control the adsorption temperature a non-adsorbed diluent (benzene) was admixed with the mixture of straight chain hydrocarbons being treated (three parts by wt. benzene per part of n-paraffin mixture) so as to substantially reduce the heat liberated during the adsorptive separation operation. Substantially the same space velocity as in Examples I and II was employed. The results of two separate runs (A and B) are set forth in Table No. III.

Table No. III

| Fraction | Vol., cc. | Contact Temp., °F. | Recovered Effluent Composition Liq. Volume Percent [a] | | | Recovered Effluent Composition Volume, cc. | | | |
|---|---|---|---|---|---|---|---|---|---|
| | | | n-C$_6$ | n-C$_7$ | n-C$_8$ | Benzene | n-C$_6$ | n-C$_7$ | n-C$_8$ |
| Run A: | | | | | | | | | |
| Charge | 580 | 490 | 34 | 32 | 34 | 435 | 49 | 47 | 49 |
| 1 | 123 | 490 | 0 | 0 | 0 | 122 | | | |
| 2 | 100 | 490 | 100 | 0 | 0 | 96.5 | 3.0 | | |
| 3 | 100 | 490 | 100 | 0 | 0 | 80.7 | 19.0 | | |
| 4 | 113 | 490 | 54 | 46 | 0 | 85.5 | 15.5 | 12.5 | |
| 5 CH$_4$ Sweep | 29 | 490 | 33 | 69 | 5 | 16.5 | 4.0 | 7.5 | 0.5 |
| 6 CH$_4$ Desorption-Regeneration | 87 | 950 | 21 | 34 | 45 | 3.5 | 17.5 | 29.0 | 37.5 |
| Run B: | | | | | | | | | |
| Charge | 600 | 550 | 34 | 32 | 34 | 450 | 51.0 | 48.0 | 51.0 |
| 1 | 237 | 550 | 0 | 0 | 0 | 236 | | | |
| 2 | 105 | 550 | 95 | 5 | 0 | 85.5 | 19.0 | 1.0 | |
| 3 | 100 | 550 | 50 | 50 | 0 | 78.0 | 11.0 | 11.0 | |
| 4 | 45 | 550 | 41 | 57 | 2 | 34.0 | 4.5 | 6.5 | |
| 5 CH$_4$ Sweep | 21 | 550 | 41 | 41 | 18 | 14.0 | 3.0 | 3.0 | 1.0 |
| 6 CH$_4$ Desorption-Regeneration | 80 | 950 | 17 | 35 | 48 | 4.5 | 13.0 | 26.5 | 36.0 |

[a] Benzene free basis.

EXAMPLE NO. 4

An equivolume mixture of n-hexane, n-heptane and n-octane (see Examples Nos. 1 and 2) was contacted with a selective adsorbent, Linde Type 5A Molecular Sieve, at atmospheric pressure and at a temperature of 300° F., a temperature substantially below the critical temperatures of n-hexane, n-heptane and n-octane, so as to substantially saturate the adsorbent with respect to these straight chain hydrocarbons. Following the above-described contacting step the saturated adsorbent was separated and subjected to various elevated desorption temperatures to selectively desorb the adsorbed components. The results are set forth in Table No. IV.

Table No. IV

| Fraction | Desorption Temp., °F. | Vol., cc. | Desorbed Effluent Composition Liquid, Vol. percent | | |
|---|---|---|---|---|---|
| | | | n-C$_6$ | n-C$_7$ | n-C$_8$ |
| Charge | | 240 | 34.0 | 32.0 | 34.0 |
| Not adsorbed | | 58 | 54.0 | 27.0 | 14.0 |
| 1 | 490 | 75 | 53.0 | 36.0 | 10.0 |
| 2 | 545 | 15 | 22.0 | 48.0 | 30.0 |
| 3 | 950 | 83 | 12.0 | 34.0 | 54.0 |

Critical temperature n-hexane 455° F.; critical temperature n-heptane 512° F.; critical temperature n-octane 565° F. For the critical temperature of various materials, especially the principal hydrocarbons, see "Physical Constants of the Principal Hydrocarbons," 4th edition, by M. P. Doss, published 1943, by The Texas Company, New York, N.Y.

This application is a continuation-in-part of our co-pending patent application, Serial No. 489,232, filed February 18, 1955, now abandoned, which discloses the separation of butadiene and other straight chain C$_4$ hydrocarbons, e.g., n-butenes, from a mixture of straight chain C$_4$ hydrocarbons. Exemplary of mixtures which may be fractionated in accordance with the practice of this invention are mixtures containing a butadiene and another straight chain hydrocarbon having a boiling point within 25° F. of the boiling point of said butadiene but possessing a critical temperature higher or lower than that of said butadiene.

As will be apparent to those skilled in the art many substitutions, modifications and changes are possible in the practice of this invention without departing from the spirit and scope thereof.

We claim:

1. A method of fractionating a mixture of straight chain hydrocarbons comprising straight chain hydrocarbons containing the same number of carbon atoms per molecule which comprises contacting said mixture with an alumino-silicate molecular sieve type solid selective adsorbent made up of porous crystals which possess pores of uniform molecular dimension, about 5 Angstrom units, sufficiently large to permit the entry of straight chain hydrocarbons and which adsorbent selectively adsorbs straight chain hydrocarbons to the substantial exclusion of non-straight chain hydrocarbons, at a contacting temperature above the critical temperature of one of said straight chain hydrocarbons in said mixture to adsorb those straight chain hydrocarbons in said mixture having a critical temperature greater than said contacting temperature to the substantial exclusion of those straight chain hydrocarbons having a critical temperature below said contacting temperature.

2. A method of fractionating a mixture comprising straight chain hydrocarbons containing the same number of carbon atoms per molecule which comprises contacting said mixture in the gaseous phase with an alumino-silicate molecular sieve type solid alumino-silicate selective adsorbent made up of porous crystals which possess pores of uniform molecular dimension, about 5 Angstrom units, sufficiently large to permit the entry of straight straight chain hydrocarbons and which adsorbent selectively adsorbs straight chain hydrocarbons to the substantial exclusion of non-straight chain hydrocarbons at a contacting temperature above the critical temperature of one of the straight chain hydrocarbons in said mixture to adsorb those straight chain hydrocarbons in said mixture having a critical temperature higher than said contacting temperature to the substantial exclusion of those straight chain hydrocarbons in said mixture having a critical temperature lower than said contacting temperature, and recovering a gaseous effluent having an increased proportion of those straight chain hydrocarbons having a critical temperature below said contacting temperature.

3. A method of fractionating a mixture containing A and B, A and B being straight chain hydrocarbons, A having a critical temperature $T_{ac}$ and B having a critical temperature $T_{bc}$, $T_{ac}$ being greater than $T_{bc}$, which comprises contacting said mixture at a temperature $T_s$, $T_s$ being lower than $T_{bc}$, with an alumino-silicate molecular sieve type solid selective adsorbent made up of porous crystals which possess pores of uniform molecular dimension, about 5 Angstrom units, sufficiently large to permit the entry of straight chain hydrocarbons and which adsorbent selectively adsorbs straight chain hydrocarbons to the substantial exclusion of non-straight chain hydrocarbons, to adsorb A and B from said mixture, subjecting the resulting adsorbent, now containing A and B adsorbed therein, to a temperature $T_f$, $T_f$ being greater than $T_{bc}$ but less than $T_{ac}$, to preferentially desorb B from said adsorbent and recovering a desorption effluent having a relatively increased proportion of B with respect to said original mixture.

4. A method of fractionating a hydrocarbon mixture comprising an admixture of straight chain hydrocarbons containing the same number of carbon atoms per molecule which comprises contacting said mixture at an adsorption temperature below the critical temperature of the straight chain hydrocarbon of said admixture which possesses the lowest critical temperature, with an alumino-silicate molecular sieve type solid selective adsorbent made up of porous crystals which possess pores of uniform molecular dimension, about 5 Angstrom units, sufficiently large to permit the entry of straight chain hydrocarbons and which adsorbent selectively adsorbs straight chain hydrocarbons to the substantial exclusion of non-straight chain hydrocarbons, subjecting the resulting adsorbent now containing at least a portion of said admixture of straight chain hydrocarbons adsorbed therein to a desorption temperature above the aforementioned lowest critical temperature but below the highest critical temperature of the straight chain hydrocarbons in said admixture contained adsorbed in said adsorbent, and recovering a resulting desorption effluent having an increased proportion of straight chain hydrocarbons having a critical temperature below said desorption temperature relative to said mixture.

5. A method in accordance with claim 3 wherein A and B are normal paraffinic hydrocarbons.

6. A method in accordance with claim 3 wherein A and B are straight chain unsaturated hydrocarbons.

7. A method in accordance with claim 3 wherein A and B are hydrocarbons selected from the group consisting of straight chain saturated and unsaturated hydrocarbons.

8. A method in accordance with claim 3 wherein A and B are isomeric straight chain unsaturated hydrocarbons.

9. A method of fractionating a mixture containing a butadiene and another straight chain hydrocarbon having a boiling point within 25° F. of the boiling point of said butadiene but possessing a critical temperature lower than that of said butadiene which comprises contacting said mixture with an alumino-silicate molecular sieve type solid selective adsorbent made up of porous crystals which possess pores of uniform molecular dimension, about 5 Angstrom units, sufficiently large to permit the entry of straight chain hydrocarbons at a temperature below the critical temperature of said butadiene but above the critical temperature of said other hydrocarbon to selectively adsorb said butadiene on said adsorbent.

10. A method of fractionating a mixture containing a butadiene and another straight chain hydrocarbon having a boiling point within 25° F. of the boiling point of said butadiene but possessing a critical temperature higher than that of said butadiene which comprises contacting said mixture with an alumino-silicate molecular sieve type solid selective adsorbent made up of porous crystals which possess pores of uniform molecular dimension, about 5 Angstrom units, sufficiently large to permit the entry of straight chain hydrocarbons at a temperature above the critical temperature of said butadiene but below the critical temperature of said other hydrocarbon to selectively adsorb said other hydrocarbon on said adsorbent.

References Cited in the file of this patent

UNITED STATES PATENTS

| 2,306,610 | Barrer | Dec. 29, 1942 |
| 2,609,887 | Berg | Sept. 9, 1952 |

OTHER REFERENCES

"Adsorption," by C. L. Mantell, McGraw-Hill Book Co., Inc. 1945, p. 12 thereof.